G. M. FRENCH AND W. B. PAVEY.
ELEVATING AND CONVEYING APPARATUS.
APPLICATION FILED APR. 2, 1919.
1,360,917.
Patented Nov. 30, 1920.
2 SHEETS—SHEET 1.
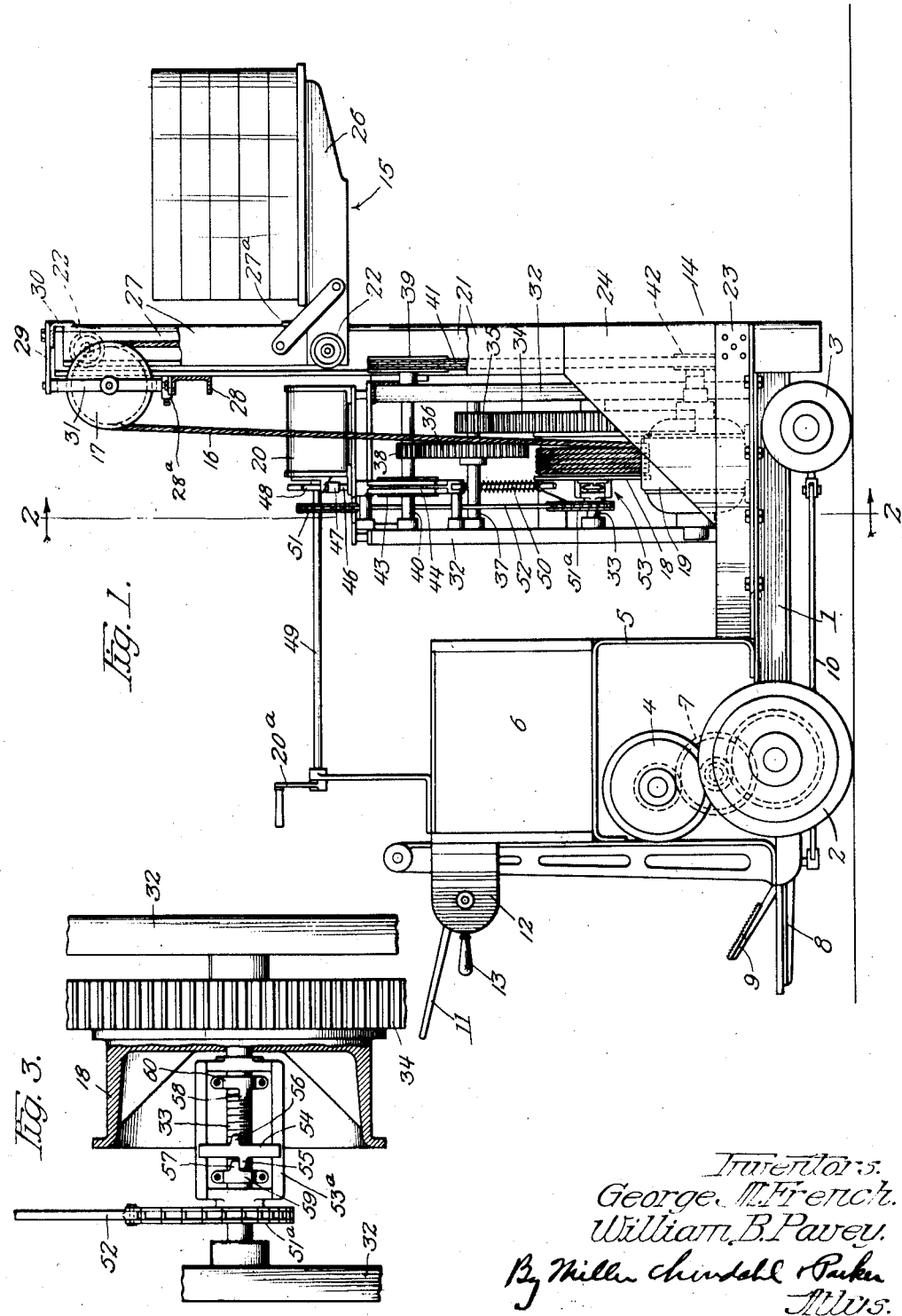
Inventors:
George M. French.
William B. Pavey.
By Miller Chindahl & Parker
Attys.

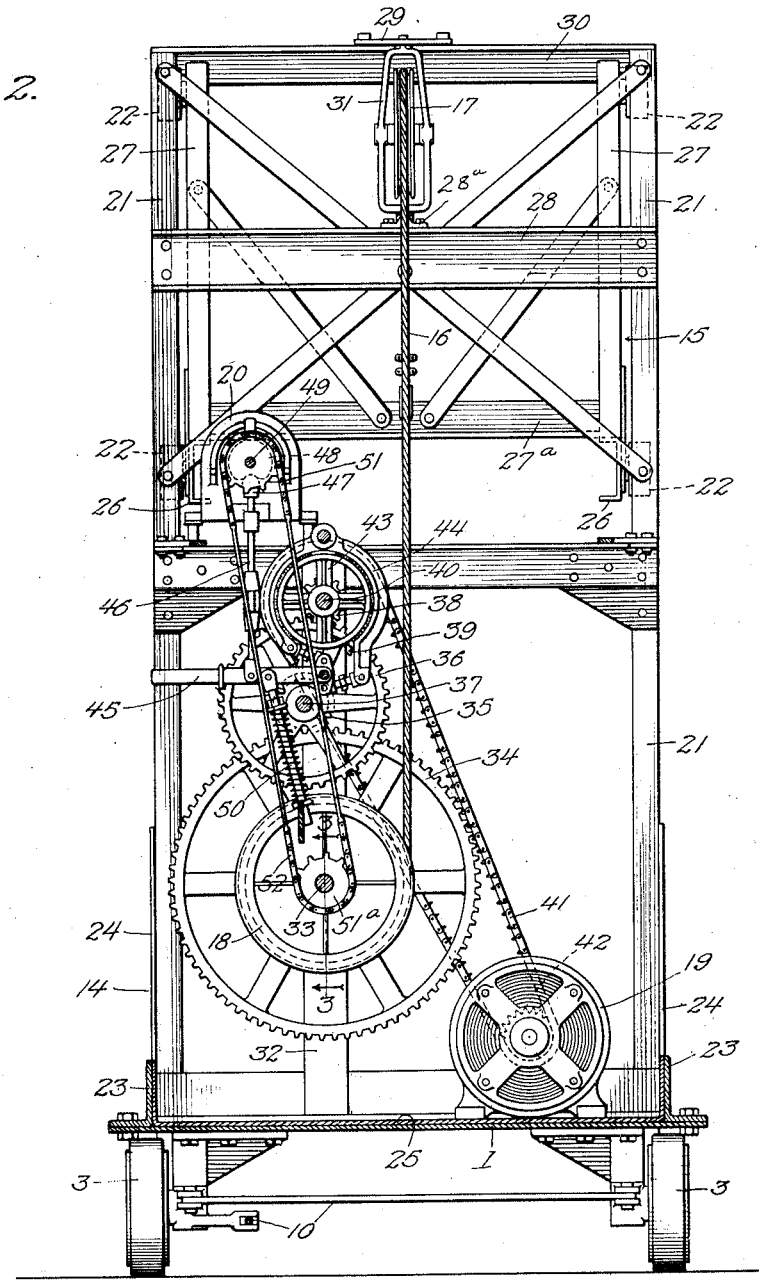

UNITED STATES PATENT OFFICE.

GEORGE M. FRENCH AND WILLIAM B. PAVEY, OF CHICAGO, ILLINOIS, ASSIGNORS TO ECONOMY ENGINEERING COMPANY, OF CHICAGO, ILLINOIS, A CORPORATION OF ILLINOIS.

ELEVATING AND CONVEYING APPARATUS.

1,360,917.  Specification of Letters Patent.  Patented Nov. 30, 1920.

Application filed April 2, 1919. Serial No. 286,944.

*To all whom it may concern:*

Be it known that we, GEORGE M. FRENCH and WILLIAM B. PAVEY, citizens of the United States, residing at Chicago, in the county of Cook and State of Illinois, respectively, have invented certain new and useful Improvements in Elevating and Conveying Apparatus, of which the following is a specification.

This invention has reference to an elevating and conveying apparatus, and the general object thereof is to provide, in combination with a truck, raising and lowering means embodying a load-supporting platform having a relatively great range of up-and-down movement.

Heretofore, trucks have been provided with a load-supporting platform capable of lifting an article supporting frame or table from off the floor a sufficient distance only to enable the load to be transported from place to place, the table being provided with legs for supporting it at a sufficient height above the floor to enable the truck body with the load-supporting platform in its lowermost position thereon to pass beneath it. Our invention overcomes such limitation of prior art devices by providing a truck with means capable of lifting or lowering a load-supporting platform to or from a substantial height, and by arranging said means in such a manner with reference to the truck body as to enable the platform to descend below the truck body substantially to the ground or floor. By reason of this construction and arrangement the apparatus is especially adapted for use in loading and unloading, as for example, upon or from a car on tracks or upon or from the top of a stack in a warehouse, the raising and lowering mechanism being capable of positioning the platform in the most advantageous position for either the loading or unloading operation.

In the accompanying drawings, wherein we have illustrated a preferred embodiment of the invention, Figure 1 is a side elevation of an apparatus embodying the features of our invention with parts broken away to show details of construction. Fig. 2 is a transverse sectional view taken on line 2—2 of Fig. 1. Fig. 3 is a fragmentary sectional view on an enlarged scale taken in the plane of line 3—3 of Fig. 2.

The truck of the apparatus is preferably of the self-propelled type and may be of well known construction. Herein we have shown an electrically propelled truck including a body 1 mounted upon wheels 2 and 3. A motor 4 inclosed within a housing 5 at one end of the body 1 receives its actuating energy from a storage battery 6 above the housing 5. The motor is operatively connected with a countershaft carrying the wheels 2 by means of gearing 7. 8 is a platform upon which the operator may stand, and 9 is a brake pedal which, when pressed down by the foot of the operator, releases a brake (not shown) for the truck wheels 2. The wheels 3 of the truck constitute the steering wheels, being provided with steering mechanism 10 including a handle 11 located above the driver's station or platform. 12 is a controller for the electric current supplied to the truck motor 4, the handle 13 of the controller being located for the convenience of the operator.

The raising and lowering apparatus comprises an upright frame 14 mounted upon the end of the truck body 1 opposite the driver's station or platform 8. This frame serves to guide the up-and-down movements of a load-supporting platform 15 which is connected by means of a cable 16 passing over a sheave 17 at the upper end of the frame 14 and thence around a winding drum 18. The drum 18 forms part of the raising and lowering mechanism of the apparatus and is arranged to be rotated by means of an electric motor 19 which also receives its energizing current from the storage battery 6. The flow of current to said motor 19 is governed by a controller 20 having its operating handle 20ª conveniently positioned for the operator standing on the platform 8.

The frame 14 comprises two channel bars 21 suitably connected together and braced, the bars being so arranged that their channels form guideways for rollers 22 of the load-supporting platform 15. In order that the downward movement of the platform shall not be limited by the truck body, the upright frame 14 is mounted so that its channel bars extend downwardly alongside the end of the truck; and to support the frame in this position a pair of angle bars 23 are mounted longitudinally of the truck body and protrude beyond the end thereof. The frame is entered between said bars and firmly secured thereto, and gusset plates 24 are preferably arranged to brace the bars 21. Said plates 24 may be formed integral with a bottom plate 25 secured to the top of the truck body.

The load-carrying platform 15 may be of any preferred construction. Herein it comprises a pair of supporting arms 26 extending horizontally outwardly from the frame 14. Said arms are rigidly secured to a guide frame consisting of a pair of channel bars 27 connected at their lower ends by a cross-bar 27$^a$ and otherwise suitably braced. The rollers 22 are mounted on the inner ends of said arm 26 and upon the upper ends of said bars 27, and are adapted to travel in the channels of the bars 21 of the upright frame 14.

Near the upper end of the upright frame 14 is secured a cross-bar 28 having a bearing member 28$^a$ thereon between which and a top-plate 29 secured upon a cross-bar 30 is mounted a frame 31 in which is journaled the sheave 17. Said frame 31 is located midway between the bars 21 of the frame 14, and the cable 16 which passes thereover, is secured at one end to the center of the cross-bar 27$^a$ of the load-supporting platform. From the sheave 17, the cable 16 extends downwardly and is wound around the winding drum 18 and secured thereto.

For the purpose of supporting the raising and lowering mechanism, including the drum 18, a frame 32 is provided near one side of the truck and arranged at right angles to the upright frame 14. Journaled in this frame near its lower end is a shaft 33 upon which the drum 18 is fixed together with a spur gear 34. Said gear is arranged to be driven from the motor 19 through gears 35 and 36 carried by a shaft 37, a gear 38 and sprocket 39 carried by a shaft 40, and a chain 41 connecting the sprocket 39 and a sprocket 42 on the motor shaft. The shafts 37 and 40 are suitably mounted in the frame 32 above the drum, and the shaft 40 carries a brake pulley 43 to which a brake band 44 of preferred construction and also carried by the frame, is arranged to engage.

The brake band is provided with a hand lever 45, but means are provided for automatically actuating the brake as well as to operate the controller 20 to cut off the current flowing to the motor 19 whereby to limit the upward movement of the platform 15 as well as to prevent it from traveling too far below the truck body. To this end the hand lever 45 is operatively connected with the controller 20 and the latter is operatively connected with the winding drum. The connection between the controller and the brake lever consists of a rod 46 having a bearing member 47 on its upper end operatively engaging with a cam 48 fixed on the controller operating rod 49. Spring means 50 of any suitable construction, herein arranged to act upon the hand lever 45, are provided for maintaining the bearing member 47 in engagement with the cam, and the cam is so shaped that when it is rotated from its normal or central position in either direction, it will act upon the brake rod 46 to swing the lever 45 and release the brake 44. The connection between the winding drum and the controller is adapted to thus actuate the cam 48 at either limit of movement of the load-supporting platform, and comprises a sprocket wheel 51 fixed on the controller operating rod 49 and connected by means of a chain-belt 52 to a sprocket 51$^a$ mounted on the winding drum shaft 33 and operable by means, indicated generally at 53, when the drum has rotated the required number of revolutions in either direction to raise or lower the platform 15 to its upper or lower limit. Said means 53 (Fig. 3) may comprise a frame 53$^a$ to which the sprocket 51$^a$ is fixed and which is rotatable on the shaft 33, and a traveling nut 54 slidably but non-rotatably engaging the frame 53$^a$ and having lugs 55 and 56 on opposite sides adapted to engage respectively with lugs 57 and 58 on collars 59 and 60 fixed to the shaft 33. When the shaft rotates, the nut 54, being normally held from rotating, travels in one direction or the other, and upon engagement with either of the fixed collars 59 or 60, is rotated and with it rotates the frame 53$^a$ and sprocket 51$^a$. It will be apparent that by adjusting the collars upon the shaft the limits of movement of the platform 15 may be readily determined.

The controller operating rod 49 has the controller handle 20$^a$ fixed on its forward end in convenient position for the operator, as hereinbefore indicated, and it will be seen that by the construction set forth a rotation thereof by the operator will serve not only to cut off the flow of current, but to actuate the brake as well. Thus the operator is enabled to control the position of the load-carrying support as may be desired.

It will be apparent that we have provided an elevating and conveying apparatus of a very practical character. By reason of the relatively great range of movement given to the load-supporting platform and of the nature of the controlling means, the support may be readily positioned as may be desired whether it be a relatively high position such as the top of a stack of bundles, an elevated platform, a car or other vehicle, or whether it be at or near the ground or floor. Moreover, since the downward movement of the load platform is not limited by the body of the truck, it will be evident that a truck of any size or capacity may be employed.

While the invention is herein set forth with considerable particularity, it will be understood that it is not to be limited in the interpretation of the appended claim to the construction and arrangement set forth except as may be necessitated by the state of the prior art.

We claim as our invention:

A combined elevating and transporting machine comprising a truck body mounted upon wheels, an upright guide frame mounted at one extreme end of the body and extending from a point below the body to a point a substantial distance above the body, a load-supporting platform guided by said frame for vertical movement above and below the body and extending in a direction away from the body beyond the frame, mechanism mounted upon the body and operatively connected with said platform whereby to raise and lower it, and propelling means for the machine including controlling mechanism therefor located at the end of the body opposite said frame and a motor operatively connected with certain of said wheels whereby to transport the machine with or without a load upon said platform from one place to another, said mechanism including a controller operating member located at the end of the machine having the controlling mechanism of the propelling means, whereby both the hoisting mechanism and the propelling means may be controlled by a single operator at one end of the machine.

In testimony whereof we have hereunto set our hands.

GEORGE M. FRENCH.
WILLIAM B. PAVEY.